3,453,221
COMMINUTION PROCESS
Douglas Stephen Richart, Wyomissing, Pa., assignor, by mesne assignments, to The Polymer Corporation, a corporation of Pennsylvania
No Drawing. Filed Jan. 9, 1964, Ser. No. 336,632
Int. Cl. C08f *47/02;* C08g *53/02;* B02c *23/00*
U.S. Cl. 260—2.5
3 Claims

ABSTRACT OF THE DISCLOSURE

Process of freeze grinding tough non-friable resins which comprises foaming a resin to form a cellular structure, contacting the foamed resins with the coolant, and grinding the foamed resin while under the influence of the coolant.

---

This invention relates to improved methods for the comminution of synthetic resinous materials and the product that results. More particularly, this invention is concerned with improvements in comminution processes whereby synthetic resinous materials are rendered more friable and the resultng pulverulent product is in a more useful form.

Processes utilizing synthetic resinous materials in pulverulent form have become of considerable commercial importance. Such processes include, for example, forming articles by pressing and sintering fine particles, preparing articles by rotational molding of powders, coating substrates by dipping them in liquid solutions and/or suspensions, and coating substrates by fusion coating processes. As the latter of these is becoming increasingly significant, particular emphasis is given herein to the formulation of pulverulent resins for fusion coating processes, though it should be understood that the novel methods here disclosed are not limited in utility to the preparation of pulverulent resins for these processes.

Fusion coating processes may be defined as those in which a substrate to be coated is contacted with heat fusible coating materials in finely divided form, and the coating materials are caused by the application heat, to fuse into a continuous coating over the substrate. As examples of fusion coating processes, there may be mentioned flame spraying, electrostatic spraying, knife coating cloud chambers, and fluidized bed coating processes.

It can be appreciated that fusion coating processes require that the heat fusible coating materials be of a small size if a uniform coating is to be obtained. The exact particle size especially suited for any of these processes will vary to some extent, but generally, and particularly with respect to the fluidized bed coating process, a particle size in a range of from about 40 mesh to about 325 mesh and below is preferred. (All screen sizes referred to herein are U.S. Standard.)

In the preparation of pulverulent materials for fusion coating processes, certain additives are often blended with the resins. Such additives may include, inter alia, pigments, fillers, plasticizers, stabilizers, etc. To obtain homogeneity in the higher quality coating materials, the additives are often melt mixed with the resins, utilizing equipment such as two roll mills, extruders, Banbury mixers and the like. While these mixing devices provide for a uniform product, such product is in the form of a continuous sheet or ribbon that cannot be utilized until chopped and then ground to pulverulent form.

Also, this fused product is often not readily friable, and may be of a tough, elastic nature which is exremely difficult and expensive to grind into pulverulent form. This is particularly true with vinyl resins. In grinding materials of this sort, considerable work must be performed on the material which work necessarily results in a heat rise during the grinding operation. This resulting increase in temperature may be sufficient, particularly at localized areas, to cause some melting of the resinous materials which, when torn apart, may produce irregular particles having elongated or hairy portions depending therefrom. (Reference to the regularity of particles as used herein does not necessarily refer to the roundness of the surface of the particles, but more particularly refers to the degree to which the ratios of the various overall dimensions of the particles approach unity.) Particles of this kind may be difficult to apply with uniformity. They are particularly undesirable for use in fluidized bed coating processes (disclosed, for example, in U.S. Patent No. 2,844,489) due to the difficulty of fluidizing hairy particles that become entangled with each other.

Due to the above difficulties, it is sometimes necessary to utilize freeze grinding techniques in the comminution of these resins. One common expediency for this includes contacting the resinous materials with liquid nitrogen prior to and during the grinding operation in order that the resins may be maintained below their embrittlement temperature while being ground. It has been found, in accordance with this invention, that the same materials may ofen be ground either without the use of any liquid nitrogen, or else with greatly reduced quantities of liquid nitrogen. Also, if liquid nitrogen is required only in small amounts, it has been found that often it may be replaced entirely with a less expensive coolant. Specifically, it has been found that in some instances, satisfactory grinding operations may be conducted with the only coolant material being water.

Accordingly, it is a principal object of this invention to provide improved methods for comminuting natural and synthetic resinous and plastic materials.

A further object of this invention is to provide processes for the comminution of resinous materials whereby a particle having greater regularity is produced.

Yet another object of this invention is to provide improved methods for grinding synthetic resinous and plastic materials whereby the need for refrigerants is either reduced or, in some instances, completely eliminated.

Another object of the present invention is to improve and increase the grindability of resinous and plastic materials.

A more specific object of this invention is to provide improved methods for preparing resinous and plastic materials for use in the fusion coating processes wherein the comminution of the resins is simplified, and the product that results is more suitable for use in these coating processes.

Briefly, the objects of this invention are achieved by expanding the synthetic resinous material by either mechanical or chemical means, so that they will include a large multiplicity of bubbles prior to conducting the grinding operation. By these means, the resinous materials are rendered more friable, and the product that results is more regular in shape.

While it is a matter of some speculation as to the reasons for the effectiveness of this invention, the following observations are thought valid. As previously mentioned, when grinding resinous materials that are heat fusible, coolants such as liquid nitrogen often must be used. these coolants perform two functions. First, they cool the resinous materials to temperatures below the embrittlement temperature of the resin, thus rendering it more friable. Secondly, the coolant serves to dissipate the heat developed due to the work performed during the grinding operation. As has been suggested above, this buildup in heat, particularly in localized areas, may cause melting of the resins which results in a tearing and pulling apart of the particles rather than fracturing along clean lines.

With respect to the instant invention, it is thought that provision for an expanded structure benefits the grinding operation in several ways. First, the expanded structure may, for purposes of visualization, be considered to be somewhat reticulated, comprised of solid portions of resin interconnected by comparatively thin supporting membranes. This, in itself, renders the material more friable, since to comminute this composite structure, it is necessary only to fracture the thin membranes, which necessarily requires less work than that required to comminute a solid mass. The reduction of the amount of work required in turn means that less heat will be developed during the grinding operation, and, accordingly, less chance of melting or softening of particles will occur.

A second benefit results from the fact that the expanded structure may more readily be penetrated by, and thus, in more intimate heat exchange relationship with, a coolant. (It should be understood that a coolant is not restricted to materials such as liquid nitrogen, but may also include such materials as water and the surrounding atmosphere.)

Thus, the efficacy of this invention may be based on these hypotheses: that there is not as much work required to comminute a reticulated structure; that the temperature rise during grinding operations is not as great; and, that the reticulated structure provides for more efficient heat transfer to the coolant.

As has previously been mentioned, the resinous materials may be expanded either by mechanical or chemical means.

With respect to mechanical means for expanding the resins, this may be accomplished by any known device for whipping or beating gases into the resins, or simply by discharging gases under pressure through a molten mass of the resinous materials.

If chemical means are used to expand the resinous materials, blowing agents are mixed with the resins and the mixture is heated to a temperature effective to cause the blowing agent to expand the resins.

As is well known, blowing agents are any materials which, by decomposition, vaporization, or other means, increase substantially in volume when their temperatures are increased a significant degree. One common technique for utilizing these blowing agents is to mix the blowing agent with the resin and expand the resin by extruding the mixture through a mixing extruder heated to or above those temperatures at which the blowing agent will become effective. Also, the blowing agent may be incorporated into the resin in milling operations, such as in a Banbury mixer or a heated two roll mill, which will enable simultaneous mixing and expansion of the blowing agent. Still further, the resin and blowing agent may be mixed together and subsequently placed in an oven or other suitable high temperature environment that will cause the blowing agent to become effective.

The amount of blowing agent added to the resin depends to some extent upon the characteristics of the product that is desired; that is, whether or not the pulverulent product is to be void-free or whether it is to contain some bubbles. If the pulverulent material is to be free of all bubbles, the blowing agent should be added in appropriate quantities to enable formation of expanded portions of the resin that are larger than the size to which the resin subsequently is comminuted. By this means, all voids or bubbles will be destroyed during the grinding operation. Also, it is important that if the resin is to be applied to a heated substrate, as in coating operations, the blowing agent should first be fully dissipated. Otherwise, the heat applied in fusion coating processes may cause the blowing action to continue when the pulverulent resins are contacted with the substrate, resulting in a foamed coating. Alternatively, if a foamed coating is desired, some active blowing agent may be left in the resinous coating materials.

In the examples below, the following test procedures were used to determine the effectiveness of this invention. After the blowing agent had been added to the resin and caused to expand, the resin was chopped to a suitable size and then submerged in liquid nitrogen until an equilibrium temperature was reached. The "frozen" resin was then ladled from the liquid nitrogen bath and placed in a pin mill-type comminuting device (160-Z Alpine mill). A screen analysis was then on the resulting comminuted particles, and this screen analysis was compared with other comminuted particles similarly prepared except for the fact that no blowing agent had been included.

EXAMPLE I

A vinyl composition suitable for coating in the fluidized bed process was prepared by mixing polyvinyl chloride resin, plasticizers, stabilizers, pigment, inert filler, and a blowing agent comprised of azodicarbonamide (Celogen AZ as sold by Naugatuck Chemical Company) and mixed in a ribbon blender. The composition was as follows (the amounts listed are in parts by weight per hundrel parts by weight resin):

Polyvinyl chloride resin _____ 100
Dioctylphthalate _____ 45
Epoxidized soya oil _____ 5
Titanium dioxide _____ 5
Calcium sulfate _____ 10
Barium/cadmium laurate _____ 3
Dibasic lead phosphate _____ 1
Azodicarbonamide _____ 0.5

After the above materials were blended in a ribbon-type blender, the material was fed to a mixing extruder and extruded at a temperature above the melting point of the PVC resin in the range of between about 290° F. to 350° F. As the material left the die of the extruder, the release in pressure caused the flowing agent to expand the material. This expanded material, in the form of a ribbon or sheet as it comes from the extruder, was then diced into pellets, frozen as discussed above, and introduced into a pin mill. A similar compound was processed identically as above, but no blowing agent was included. The screen analyses of two samples were as given below:

| Screen size | Cumulative, percent retained | |
|---|---|---|
| | With blowing agent | Control |
| 50 | 1 | 4 |
| 70 | 8 | 8 |
| 100 | 9 | 22 |
| 140 | 30 | 46 |
| 200 | 62 | 69 |
| 270 | 64 | 78 |
| 325 | 80 | 91 |

EXAMPLE II 0.5% by weight azodicarbonamide was added to type 11 nylon and mixed in a Henschel mill. After carefully mixing the blowing agent and the nylon in a Henschel mill, the material was spread on a shallow pan and placed in an oven heated to 450° F. for a period of about 15 minutes. This resulted in the blowing agent expanding the nylon resin. A sample of this material was frozen in liquid nitrogen and ground in a pin mill, and the results obtained as compared with a control in which no blowing agent had been included are as given below:

| Screen size | Cumulative, percent retained | |
|---|---|---|
| | With blowing agent | Control |
| 40 | 2.6 | 6.1 |
| 50 | 10.0 | 19.6 |
| 70 | 25.3 | 38.2 |
| 100 | 47.5 | 62.3 |
| 140 | 73.8 | 80.0 |
| 200 | 85.2 | 88.7 |
| 270 | 90.0 | 92.5 |
| 325 | 95.0 | 96.8 |

EXAMPLE III

A chlorinated polyether resin (sold under the tradename Penton by the Hercules Chemical Company) was mixed as in Example I with 1% of an azodicarbonamide blowing agent. After foaming, it was frozen in liquid nitrogen as mentioned above, and ground in a pin mill. Screen analyses of the material so prepared and a control sample of chlorinated polyether resin to which no blowing agent had been added were given as below:

| Screen size | Cumulative, percent retained | |
|---|---|---|
| | With blowing agent | Control |
| 70 | 3.5 | 7.5 |
| 100 | 27.0 | 42.5 |
| 140 | 49.0 | 65.0 |
| 200 | 65.5 | 81.0 |
| 270 | 81.5 | 94.0 |
| 325 | 88.0 | 96.5 |

From the above examples, it can be seen that the resinous materials that were expanded prior to the comminution operation yielded, under identical treatment with the control samples, a considerably finer particle size. Further, optical examination of the comminuted particles indicated that those prepared by expanding the resin prior to the grinding operation had a greater regularity and were comparatively free of entrailing hairy particles.

I claim:
1. In a process for free grinding tough, non-friable resins wherein the resins are contacted with a coolant material; the improvement comprising a method for reducing consumption of the coolant material by foaming the resins to form a cellular structure, contacting the foamed resins with the coolant, and grinding the foamed resins while under the influence of the coolant.

2. A process according to claim 1, wherein the resins are foamed by heating the resins to a temperature above their softening point, dispersing gas by mechanical mixing throughout the heat softened resin, and cooling the resin to a temperature below their softening point.

3. A process according to claim 1, wherein the resins are foamed by mixing a blowing agent with the resins, heating the resins to a temperature above its softening point and above the temperature at which the blowing agent is effective to foam the resins, and cooling the resins to a temperature below their softening point.

References Cited

UNITED STATES PATENTS

| | | | |
|---|---|---|---|
| 2,256,483 | 9/1941 | Johnston. | |
| 2,576,977 | 12/1951 | Stober. | |
| 3,138,478 | 6/1964 | Hedman et al. | |
| 3,338,848 | 8/1967 | Hamilton. | |
| 2,663,907 | 12/1963 | Downing et al. | 241—3 |
| 2,707,045 | 5/1955 | Demm et al. | 241—3 |
| 2,911,382 | 1/1959 | Barkhuff | 241—3 |
| 2,945,827 | 7/1960 | Henning | 260—2 |
| 2,858,299 | 10/1958 | Tuzzetta | 260—2.5 |
| 2,956,960 | 10/1960 | Nemphoc | 260—2.5 |
| 3,037,903 | 6/1962 | Baumann. | |
| 3,038,867 | 6/1962 | Czepiel. | |
| 3,210,239 | 10/1965 | Eberl et al. | |

OTHER REFERENCES

Perry's Chemical Engineer's Handbook, 4th Edition, 1963, pp. 8–55.

MURRAY TILLMAN, *Primary Examiner.*

M. FOELAK, *Assistant Examiner.*

U.S. Cl. X.R.

117—104, 105.2; 241—2, 3, 23; 260—23, 95

PO-1050
(5/69)

UNITED STATES PATENT OFFICE
CERTIFICATE OF CORRECTION

Patent No. 3,453,221          Dated July 1, 1969

Inventor(s) Douglas Stephen Richart

It is certified that error appears in the above-identified patent and that said Letters Patent are hereby corrected as shown below:

Column 1, line 25, "resultng" should be --resulting; line 43, after "application" insert --of--; line 70, "exremely" should be --extremely--. Column 2, line 27, "ofen" should be --often--line 66, "these" should be --These--. Column 4, line 9, after "then" insert --run--; line 21, "hundrel" should be --hundred--; line 37, "flowing" should be --blowing--. Column 5, line 28, "free" should be --freeze--. Column 6, line 17, "12/1963" should be --12/1953--; line 18, "Demm et al 2,707,045" should be --Demon et al 2,709,045--; line 19, "1/1959" should be --11/1959--; line 21, "Tuzzetta" should be --Guzzetta--; line 22, "Nemphoc" should be --Nemphos--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents